(12) United States Patent
Baumgartner et al.

(10) Patent No.: US 8,616,347 B2
(45) Date of Patent: Dec. 31, 2013

(54) PNEUMATICALLY ACTUABLE DISC BRAKE

(75) Inventors: Johann Baumgartner, Moosburg (DE);
Robert Gruber, Pfaffing (DE);
Aleksandar Pericevic, Munich (DE);
Steffen Geissler, Rodgau (DE); Robert Trimpe, Wessling (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 344 days.

(21) Appl. No.: 13/017,580

(22) Filed: Jan. 31, 2011

(65) Prior Publication Data

US 2011/0209952 A1    Sep. 1, 2011

Related U.S. Application Data

(63) Continuation of application No. PCT/EP2009/005561, filed on Jul. 31, 2009.

(30) Foreign Application Priority Data

Aug. 1, 2008  (DE) .......................... 10 2008 036 032

(51) Int. Cl.
*F16D 55/46*   (2006.01)

(52) U.S. Cl.
USPC ....................................... 188/72.2; 188/72.9

(58) Field of Classification Search
USPC ........... 188/72.2, 72.7, 72.9, 71.1, 71.8, 71.9, 188/196 R, 196 V
See application file for complete search history.

(56) References Cited

U.S. PATENT DOCUMENTS

| | | | |
|---|---|---|---|
| 2,655,229 A | 10/1953 | Eksergian | |
| 2,888,102 A | 5/1959 | Eksergian et al. | |
| 6,354,407 B1 * | 3/2002 | Heinlein et al. | 188/71.1 |
| 7,175,006 B2 * | 2/2007 | Plantan et al. | 188/72.9 |
| 7,258,206 B2 * | 8/2007 | Severinsson | 188/72.7 |
| 7,815,021 B2 * | 10/2010 | Baumgartner et al. | 188/72.9 |
| 7,950,502 B2 * | 5/2011 | Baumgartner et al. | 188/71.9 |
| 8,286,759 B2 * | 10/2012 | Baumgartner et al. | 188/72.9 |

(Continued)

FOREIGN PATENT DOCUMENTS

| | | |
|---|---|---|
| DE | 26 29 211 A1 | 1/1978 |
| DE | 102 36 606 A1 | 2/2004 |

(Continued)

OTHER PUBLICATIONS

German Office Action dated Jul. 30, 2009 with English translation (nine (9) pages).

(Continued)

*Primary Examiner* — Thomas J Williams
*Assistant Examiner* — Mariano Sy
(74) *Attorney, Agent, or Firm* — Crowell & Moring LLP

(57) ABSTRACT

A pneumatic disc brake includes a caliper which straddles a brake disc, brake pads pressable against the brake disc and a rotary lever actuated brake application device, and a self-energizing mechanism. The brake lever is pivotable about an eccentric axis by a brake cylinder plunger. A self-energizing factor is selected to ensure that the brake automatically releases after braking events. The brake lever is supported on a spherical bearing element mounted to the caliper and forming the eccentric axis. The brake lever bears against a bearing ball which is arranged above the bearing element in the direction of the plunger engagement point, which bearing ball is positioned in a brake ram coupled to the brake pad.

11 Claims, 3 Drawing Sheets

(56) References Cited

U.S. PATENT DOCUMENTS

| | | | |
|---|---|---|---|
| 2004/0026181 A1 | 2/2004 | Baumgartner et al. | |
| 2006/0124406 A1* | 6/2006 | Baumgartner | 188/71.8 |
| 2007/0158145 A1 | 7/2007 | Bieker et al. | |
| 2009/0194377 A1 | 8/2009 | Baumgartner et al. | |
| 2009/0258119 A1 | 10/2009 | Nevalainen et al. | |
| 2009/0321195 A1 | 12/2009 | Baumgartner et al. | |
| 2010/0012441 A1 | 1/2010 | Baier-Welt et al. | |
| 2011/0005871 A1 | 1/2011 | Pericevic et al. | |
| 2011/0147139 A1* | 6/2011 | Baumgartner et al. | 188/72.1 |
| 2011/0155519 A1* | 6/2011 | Baumgartner et al. | 188/72.2 |
| 2011/0209951 A1* | 9/2011 | Baumgartner et al. | 188/72.2 |

FOREIGN PATENT DOCUMENTS

| | | |
|---|---|---|
| DE | 103 00 013 A1 | 7/2004 |
| DE | 103 92 252 T5 | 3/2005 |
| DE | 10 2006 029 942 A1 | 8/2007 |
| DE | 10 2006 010 215 B3 | 10/2007 |
| DE | 10 2006 036 278 B3 | 10/2007 |
| DE | 10 2006 046 030 A1 | 4/2008 |
| DE | 10 2008 004 806 A1 | 7/2009 |
| EP | 0 553 105 B1 | 8/1993 |
| EP | 1 230 491 B1 | 8/2002 |
| EP | 1 319 858 A2 | 6/2003 |
| WO | WO 02/14127 A2 | 2/2002 |
| WO | WO 2007/082658 A1 | 7/2007 |
| WO | WO 2008014926 A1 * | 2/2008 |

OTHER PUBLICATIONS

International Search Report dated Nov. 5, 2009 with English translation (eight (8) pages).

* cited by examiner

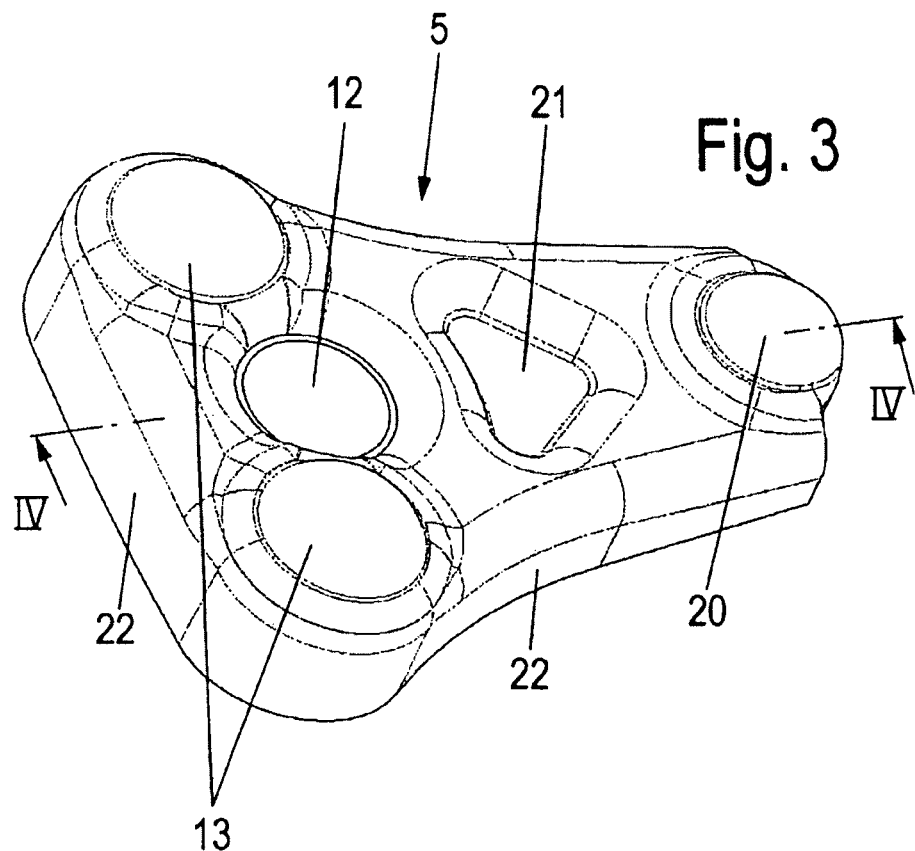
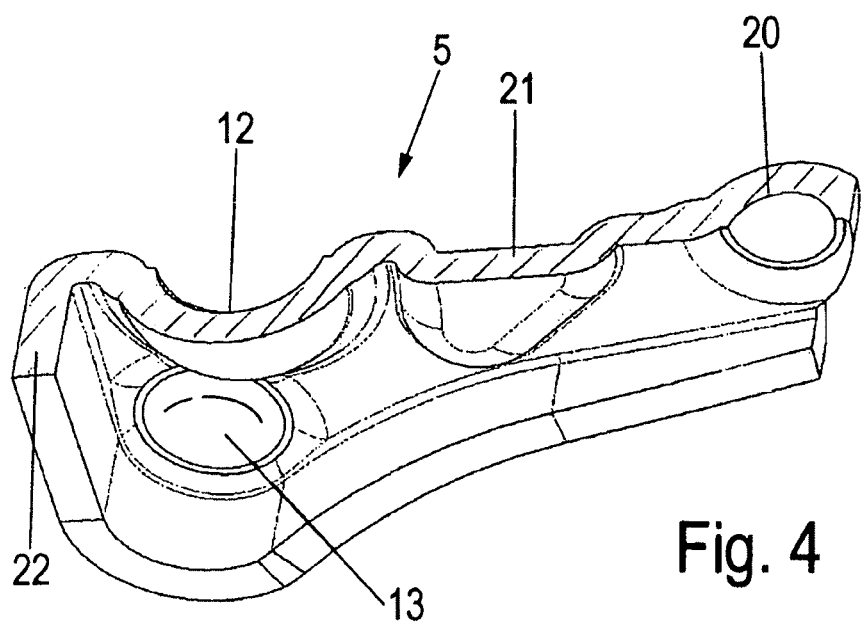

PNEUMATICALLY ACTUABLE DISC BRAKE

CROSS-REFERENCE TO RELATED APPLICATIONS

This application is a continuation of PCT International Application No. PCT/EP2009/005561, filed Jul. 31, 2009, which claims priority under 35 U.S.C. §119 from German Patent Application No. DE 10 2008 036 032.5, filed Aug. 1, 2008, the entire disclosures of which are herein expressly incorporated by reference.

This application contains subject matter related to U.S. application Ser. No. 13/017,566, entitled "Pneumatically Actuable Disc Brake," filed on even date herewith.

BACKGROUND AND SUMMARY OF THE INVENTION

The invention relates to a pneumatically actuable disc brake having a caliper straddling a brake disc. Brake pads press against both sides of the brake disc. A brake-application-side brake pad is actuable using a rotary lever of a brake application unit, which lever is pivotable around an eccentric axis. A plunger of a brake cylinder, which is actuable using compressed air, engages on the rotary lever.

Such a pneumatically actuable disc brake is known, for example, from EP 0 553 105 B1 and EP 1 230 491 B1.

The rotary lever, which is formed on one end as an eccentric and is supported on the caliper, is produced very solidly as a steel forged part or from a high-strength cast iron material because of the high operating forces to be transmitted.

Because of the large lever transmission ratio, for example, i=L1: e=15.6:1 (L1=length of the lever arm, e=eccentricity), which results from the ratio between the brake force to be applied and the applied force of the brake cylinder, from which a correspondingly large pivot angle of the brake lever in turn results, correspondingly high friction losses of the eccentric mounting result. Roller bearing half-shells, which encompass the eccentric mounting, are used to reduce the friction losses.

The design of the lever is performed in such a manner that no bending torques and deformations in the caliper resulting therefrom are caused by the force transmission from the roller bearings to be supported to the eccentric bearing.

However, the production of such roller bearings is only possible with a substantial manufacturing expenditure, having correspondingly high production costs.

In addition, such a roller bearing is naturally relatively susceptible to malfunction, which hinders an optimized service life.

It is therefore proposed in cited EP 1 230 491 B1 that friction bearings, which are distinguished by particularly high robustness, in addition to low production costs, be used exclusively for mounting the brake lever on the caliper.

However, the coefficients of friction of the maintenance-free friction bearings which are used are multiple times greater than the rolling resistance value of the roller bearings, which naturally has an effect on the provision of a brake force to be applied by the brake cylinder.

Due to the relatively large bearing diameter, a distance results from the eccentric rotational axis to an engagement point on the brake-application-side brake pad, from which an additional bending torque acting on the brake lever results. In order to keep a deformation of the brake lever resulting therefrom small, it is implemented as very solid, although the mentioned deformations and the increased stroke requirement of the brake cylinder resulting therefrom cannot be entirely avoided.

Overall, the known disc brakes of the type described above are incapable of meeting the requirements placed in this regard, in particular with respect to the required installation space, the existing weight, and the efficiency.

The invention is based on the object of improving a disc brake of the type described above in such a manner that it is optimized with respect to its installation space, its weight, its efficiency, and its production costs.

This and other objects are achieved by a disc brake having a caliper straddling a brake disc. Brake pads press against both sides of the brake disc. A brake-application-side brake pad is actuable using a rotary lever of a brake application unit, which lever is pivotable around an eccentric axis. A plunger of a brake cylinder, which is actuable using compressed air, engages on the rotary lever. A self-energizing unit is provided, which has a self-energizing factor selected such that the brake automatically releases after braking events. The rotary lever is supported at least on a spherical bearing element, which is mounted in the caliper and forms the eccentric rotational axis. The lever presses against a bearing ball, which is situated in the direction of the plunger engagement above the bearing element, and is positioned in a brake ram connected to the brake-application-side brake pad.

Through the self-energizing device provided according to the invention, which heretofore has been used exclusively in electro-mechanically actuable disc brakes, the power demand of the brake cylinder is reduced, with the result of a substantial installation space reduction, while the operating behavior of the brake remains the same.

A substantial reduction of the overall size of the brake cylinder is already possible using relatively small self-energizing factors. The self-energizing is selected by appropriate dimensioning of wedge or ramp angles in such a manner that reliable automatic release of the brake still results even in the case of a maximum possible coefficient of friction of the brake pads.

In contrast to electro-motively actuated disc brakes, the force generator for applying the brake therefore does not also have to be used for release.

The overall space reduction is possible in particular through the smaller stroke, which is reduced from 65 mm to 24 mm, for example. Similarly, the required actuation energy is also reduced to one-third of the prior actuation energy. This allows significantly smaller dimensioning of the friction bearing elements of the brake lever, whereby the bending torque acting on the brake lever is also reduced.

In addition to this desired effect, which results through the invention, a significant reduction of the bearing friction is also reached, which is achieved, on the one hand, by the smaller dimensioning and, on the other hand, by the minimized required pivot angle of the brake lever, which results in an improvement of the mechanical efficiency.

The mentioned reduction of the pivot angle results from a decrease of the lever transmission ratio which, as noted at the beginning, is 15.6:1 in a disc brake according to the prior art, while it is in the range of from 7:1 to 10:1, preferably 7.5:1, i.e., noticeably smaller, due to the invention.

With the aid of the invention, an overall length reduction of the brake cylinder is therefore possible, as well as a weight savings, which corresponds to the requirements in this regard, from which a fuel savings is derived overall. This is also contributed to by the fact that the brake lever can be designed in a weight-optimized manner due to the reduced bending strain thereof, the brake lever only corresponding with one brake ram, which engages centrically in the axial plane in relation to the rotational axis of the brake disc, and which is supported by two pressure rams. The two pressure rams are situated on both sides of the brake ram and engage on one end side on the caliper and on the other end side on the brake-application-side brake pad. The pressure rams dissipate their reaction force directly into the caliper.

The brake lever is preferably produced as a formed part without machining and can be implemented as a relatively thin-walled forged part having embossed bearing seats, as a type of precision forged part, or as a sheet-metal formed part. Fundamentally, of course, manufacturing from a high-strength cast iron material using subsequent machining is also possible.

According to a further aspect of the invention, the brake lever is provided with an angled, at least partially peripheral edge, by which a high stiffness is achieved at low weight. In addition, stiffening beads or the like can be introduced.

To increase the strength, the brake lever insert can be hardened or quenched and tempered.

The bearing receptacles, in the form of spherical caps, are provided with a friction-reducing and/or wear-reducing coating, or may be lined using metal-composite friction bearing shells.

For the drive of a wear adjustment unit, a tooth contour which is capable of engaging in an adjuster drive wheel can be embossed on the brake lever or fastened on as a separate part by welding, for example.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 shows a brake lever of the disc brake in a perspective view; and

FIG. 4 shows a longitudinal section through the brake lever taken along line IV-IV in FIG. 3.

DETAILED DESCRIPTION OF THE DRAWINGS

Figure 1:
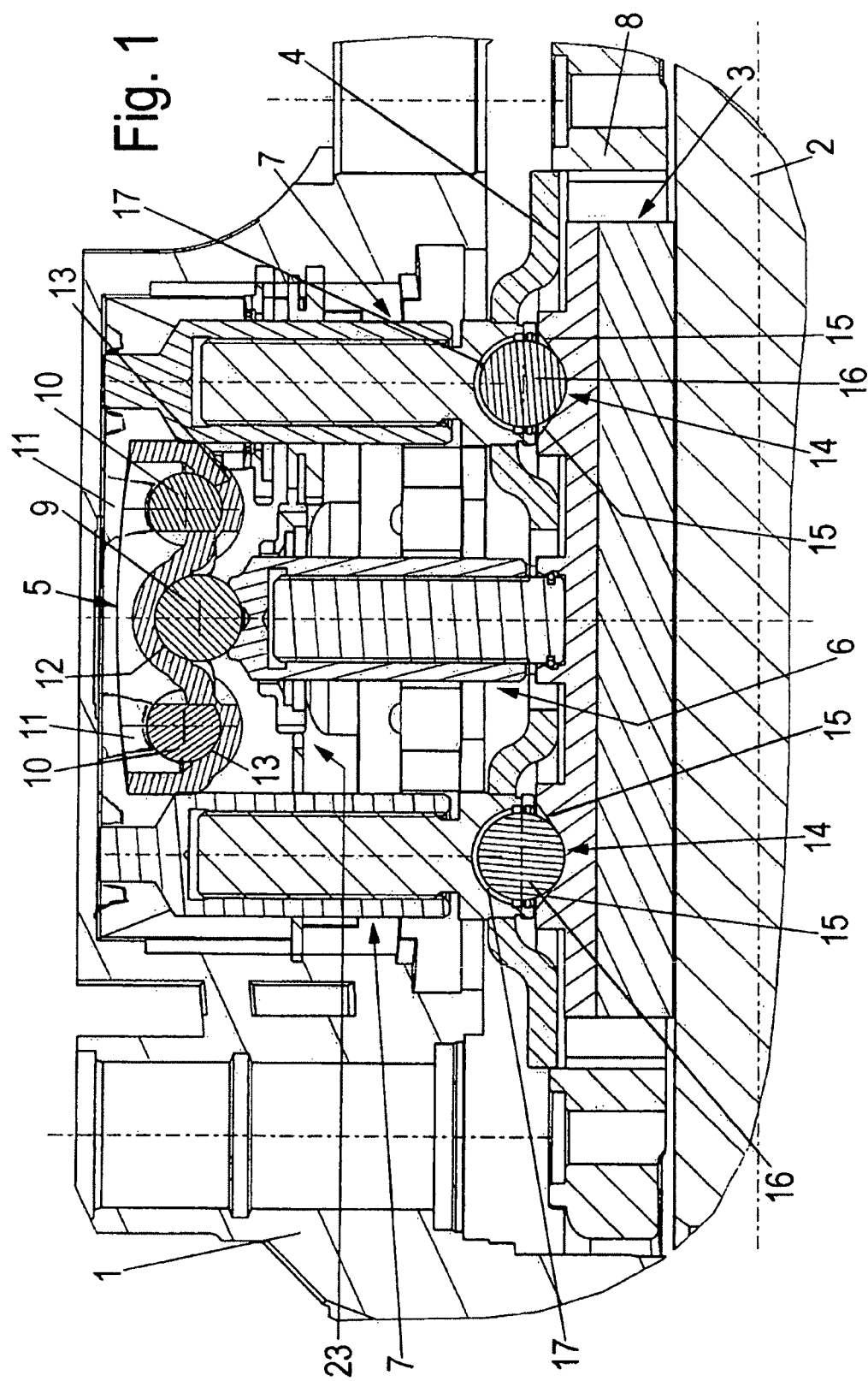
FIG. 1 shows a detail of an exemplary disc brake according to the invention in a sectional top view.
Figure 2:
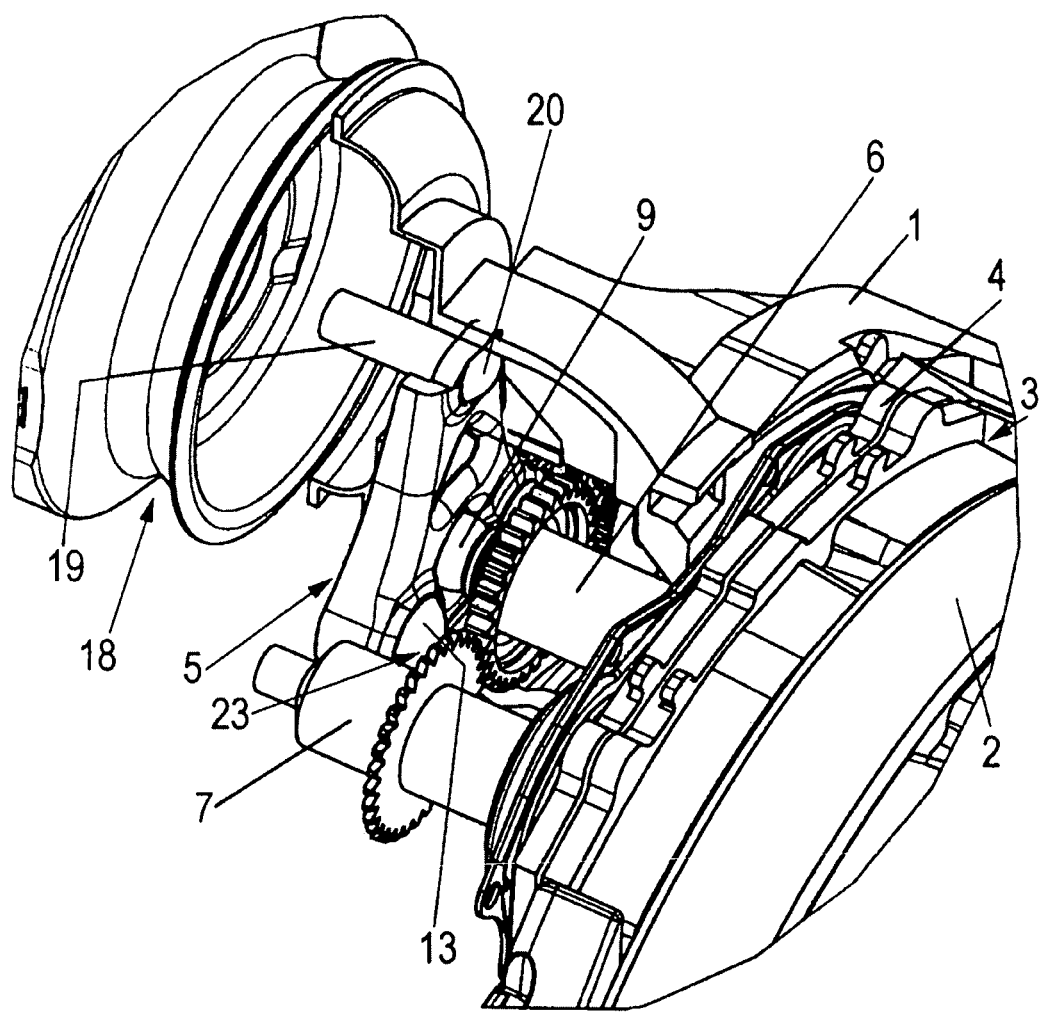
FIG. 2 shows a further detail in partial section of the disc brake in a perspective view.

A self-energizing disc brake is shown in FIGS. 1 and 2, having a caliper 1 mounted on a fixed brake carrier 8, a brake-application-side brake pad 3, and a reaction-side brake pad (not shown), which can be pressed against a brake disc 2.

To apply the brake pads, a brake application device is provided in the form of a brake lever 5 and a brake ram 6, via which the brake-application-side brake pad 3 is movable in an axial direction in relation to the rotational axis of the brake disc 2.

A brake cylinder 18 (FIG. 2), which is actuable using compressed air, engages via a connected plunger 19 on the brake lever 5, the brake lever 5 having a bearing recess 20 in the engagement area of the plunger 19, which is adapted to the crowned front side of the plunger 19.

The brake lever 5 is rotatable around an eccentric rotational axis toward the brake ram 6. The eccentric rotational axis is formed by two spherical bearing elements 10, which are seated on one side in spherical caps 13 of the brake lever 5 and on the other side in spherical cap attachments 11 of the caliper 1, the spherical cap attachments 11 each practically forming a buttress.

A bulge 12, which is adapted to a bearing ball 9, is provided in the brake lever 5 between the bearing elements 10 forming the two support bearings or the assigned spherical caps 13. The bearing ball 9 is seated in the bulge 12 and is held on the other side on an end of the brake ram 6.

The eccentricity of the brake lever 5 is determined from the center point distance of the spherical cap 13 or the bearing elements 10 to the bulge 12 or the seated bearing ball 9, the bearing ball 9 being situated above the bearing elements 10 in relation to the bearing recess 20.

A self-energizing unit is further provided, which has split bearings 14, to each of which a pressure ram 7 is assigned. The pressure rams 7 are engaged with a wear adjustment unit 23 for the wear-related adjustment of the brake pad 3.

The pressure rams 7 are held using their end area facing toward the brake pad 3 in a guide plate 4, which is displaceable in the brake carrier plate 8 in the brake application direction.

Each split bearing 14 has a bearing ball 16, which is sunken frontally in the assigned pressure rams 7 and positioned therein in a friction bearing shell 17. The bearing ball 16 is seated on the other side in a depression in the form of a spherical cap, whose side wall is implemented as rising ramps 15.

During braking, i.e., when the brake pad 3 is pressed against the brake disc 2 using the brake lever 5, peripheral forces arise, by which the brake pad 3 is displaced in the rotational direction of the brake disc 2, while changing the distance of the brake pad 3 to the pressure ram 7.

Upon release of the brake, the brake pad 3 is returned by a restoring spring (not shown) into a so-called relaxed starting position, in which the bearing ball 16 is seated practically without function in the depression of the brake pad 3.

An exemplary embodiment of the brake lever 5, which is implemented in this case as a sheet-metal formed part, for example, is shown in FIGS. 3 and 4. It may be seen that the brake lever 5 has an approximately trapezoidal lateral surface, on whose wide side the two spherical caps 13 are pushed out, while the bearing recess 20 is formed oriented in the same direction on the opposing end area. 2

The bulge 12 in the form of a spherical cap is located between the two spherical caps 13, in the direction of the bearing recess 20 and spaced apart therefrom, having its concave inner side opposite to those of the formations of the spherical caps 13 and the bearing recess 20.

To stiffen the brake lever 5 as a whole, it has a partially peripheral angled edge 22, which extends in the direction of the bulge 12 that is pushed out. The angled edge is omitted in the end area assigned to the bearing recess 20.

Furthermore, a depression 21 is introduced between the bulge 12 and the bearing recess 20 to increase the bending stiffness.

TABLE OF REFERENCE NUMERALS 1 caliper
2 brake disc
3 brake pad
4 guide plate
5 brake lever (rotary lever)
6 brake ram
7 pressure ram
8 brake carrier
9 bearing ball
10 bearing element
11 spherical cap attachment
12 bulge 13 spherical cap
14 split bearing
15 ramp
16 bearing ball
17 friction bearing shell
18 brake cylinder
19 plunger
20 bearing recess
21 depression
22 edge
23 wear adjustment unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pneumatic disc brake for use with a brake disc to apply brake pads against the brake disc, the disc brake comprising:
   a caliper configured to straddle the brake disc;
   a brake application unit arranged in the caliper, the brake application unit including a brake lever operable by a plunger of a brake cylinder to rotate about an eccentric axis in order to displace a brake-application-side brake pad against the brake disc;
   a self-energizing mechanism having a self-energizing factor selected such that the disc brake automatically releases after a braking event;
   a brake ram coupled to the brake-application-side brake pad; and
   first and second pressure rams, each pressure ram being arranged in parallel and at a distance on each side of the brake ram, each pressure ram being supported at one end on the caliper and at another end via a pressure ram bearing ball on the brake pad;
   a guide plate operatively configured to hold the pressure rams, the guide plate being mounted to be displaceable in a brake carrier in an axial direction relative to the brake disc,
   wherein
      the brake lever is supported at least on at least one spherical bearing element mounted in the caliper and forming an eccentric rotational axis, the brake lever pressing against a brake lever bearing ball located closer to a plunger engagement end of the brake lever than the at least one spherical bearing element; and
      the brake lever bearing ball is positioned in the brake ram,
      the at least one spherical bearing element comprises two bearing elements that are operatively configured to support the brake lever, the brake lever bearing ball being arranged at a location between the two bearing elements,
      the brake lever comprises spherical caps configured to receive each of the two bearing elements and a bulge configured to receive the brake lever bearing ball, and the brake application unit is operatively configured such that when the self-energizing mechanism's self-energizing factor is selected such that the disc brake automatically releases after every braking event, a rotational lever transmission ratio is in a range of about 7:1 to 10:1.

2. The pneumatic disc brake according to claim 1, further comprising spherical cap attachments of the caliper, the spherical cap attachments being operatively configured to support each of the two bearing elements.

3. The pneumatic disc brake according to claim 1, wherein at the plunger engagement end of the brake lever, the brake lever has a bearing recess operatively configured to receive the plunger of the operating cylinder.

4. The pneumatic disc brake according to claim 1, wherein the rotational lever transmission ratio is about 7.5:1.

5. The pneumatic disc brake according to claim 1, wherein the brake lever has an angled edge extending at least partially about a periphery of the brake lever.

6. The pneumatic disc brake according to claim 1, wherein the brake lever is one of a sheet-metal and cast part.

7. The pneumatic disc brake according to claim 5, wherein the brake lever is one of a sheet-metal and cast part.

8. The pneumatic disc brake according to claim 1, wherein the brake lever has at least one depression operatively configured to stiffen the brake lever.

9. The pneumatic disc brake according to claim 6, wherein the brake lever has at least one depression operatively configured to stiffen the brake lever.

10. A pneumatic disc brake for use with a brake disc, the disc brake comprising:
    a caliper;
    a brake application unit having a rotary lever pivotable about an eccentric axis and a brake ram coupleable at one end to a brake-application-side brake pad;
    a self-energizing mechanism having a self-energizing factor selected such that the disc brake automatically releases after a braking event;
    two spherical bearing elements mounted in the caliper for supporting the rotary lever, the two spherical bearing elements defining the eccentric axis and being received in corresponding bearing pockets formed at one end of the rotary lever;
    a bearing ball positioned at one end of the brake ram, the bearing ball being received in a pocket of the rotary lever on an opposite side of the bearing pockets; and
    whereby rotation of the rotary lever presses the bearing ball in a direction toward the brake disc and when the self-energizing mechanism's self-energizing factor is selected such that the disc brake automatically releases after every braking event, a rotational lever transmission ratio is in a range of about 7:1 to 10:1.

11. The pneumatic disc brake according to claim 10, wherein the pocket receiving the bearing ball is located between the two spherical bearing elements and closer to an end of the rotary lever that is actuated via an operating cylinder for the disc brake than the two spherical bearing elements.

* * * * *